US011666042B2

(12) United States Patent
Vesich et al.

(10) Patent No.: US 11,666,042 B2
(45) Date of Patent: Jun. 6, 2023

(54) NET HAVING HOOP FRAME CONNECTED TO HANDLE

(71) Applicant: AOB Products Company, Columbia, MO (US)

(72) Inventors: Anthony Vesich, Columbia, MO (US); Dennis W. Cauley, Jr., Fayette, MO (US); Timothy S. Kinney, Warrenton, MO (US); Michael Cottrell, Ashland, MO (US); James Tayon, Moberly, MO (US); Mark Dalton, Columbia, MO (US); Justin Burke, Columbia, MO (US); Brian Steere, Columbia, MO (US); Matthew Kinamore, Columbia, MO (US); Curtis Smith, Columbia, MO (US)

(73) Assignee: AOB Products Company, Columbia, MO (US)

( * ) Notice: Subject to any disclaimer, the term of this patent is extended or adjusted under 35 U.S.C. 154(b) by 57 days.

(21) Appl. No.: 17/450,923

(22) Filed: Oct. 14, 2021

(65) Prior Publication Data

US 2022/0030838 A1 Feb. 3, 2022

Related U.S. Application Data

(62) Division of application No. 16/215,111, filed on Dec. 10, 2018, now Pat. No. 11,166,442.

(51) Int. Cl.
*A01K 77/00* (2006.01)
*A01K 75/00* (2006.01)
(52) U.S. Cl.
CPC .............. *A01K 77/00* (2013.01); *A01K 75/00* (2013.01)

(58) Field of Classification Search
CPC .................................. A01K 77/00; A01K 75/00
USPC ............................................................. 43/11
See application file for complete search history.

(56) References Cited

U.S. PATENT DOCUMENTS

| 1,897,515 | A | * | 2/1933 | Hedstrom | A63B 60/06 403/376 |
| 1,957,944 | A | * | 5/1934 | Dexter | A01K 77/00 43/12 |
| 2,491,703 | A | * | 12/1949 | Bell | A01K 77/00 43/12 |
| 2,600,773 | A | | 6/1952 | Hungerford | |
| 2,615,272 | A | * | 10/1952 | Wells | A01K 77/00 43/12 |
| 2,874,506 | A | | 2/1959 | Cliff | |

(Continued)

FOREIGN PATENT DOCUMENTS

| FR | 2652715 A1 * | 4/1991 |
| FR | 2652715 A1 | 4/1991 |

(Continued)

*Primary Examiner* — Christopher P Ellis
(74) *Attorney, Agent, or Firm* — Stinson LLP (57) ABSTRACT

A net for fishing or other purposes. The net includes a hoop frame connected to a pole by a yoke. The yoke defines sockets in which respective arms of the hoop frame and a distal end of the pole are received. Plugs in the arms of the hoop frame desirably prevent water from passing the plugs into the hoop frame. A plug in the distal end of the pole desirably prevents water from passing the plug into the pole. The yoke and plugs provide a robust connection of the hoop frame to the pole and help retain air in the hoop frame and pole for buoyancy of the net.

9 Claims, 8 Drawing Sheets

(56) References Cited

U.S. PATENT DOCUMENTS

| | | | | |
|---|---|---|---|---|
| 2,954,633 | A * | 10/1960 | Harding | A01K 77/00 43/12 |
| 3,077,693 | A * | 2/1963 | Wallin | A01K 77/00 43/17.5 |
| 3,579,890 | A * | 5/1971 | Maxwell | A01K 77/00 43/12 |
| 3,670,444 | A | 6/1972 | Dieterich | |
| 3,760,523 | A | 9/1973 | Maxwell | |
| D229,691 | S | 12/1973 | Maxwell | |
| 4,138,790 | A * | 2/1979 | Schmucker | A01K 77/00 43/12 |
| 4,481,117 | A | 11/1984 | Collins | |
| 4,619,065 | A | 10/1986 | Jones | |
| 4,765,420 | A | 8/1988 | Mengo | |
| 4,776,129 | A | 10/1988 | Kelly | |
| D319,681 | S | 9/1991 | Mengo | |
| 5,050,920 | A | 9/1991 | Potticary | |
| 5,471,778 | A * | 12/1995 | Marfori | A01K 77/00 43/12 |
| D526,042 | S | 8/2006 | Corbett et al. | |
| 7,124,533 | B2 | 10/2006 | Kleckner | |
| D549,800 | S | 8/2007 | Corbett et al. | |
| 10,717,183 | B1 * | 7/2020 | LaHood | B25G 1/04 |
| 2003/0102416 | A1 * | 6/2003 | Adams | A01K 77/00 248/289.31 |
| 2006/0026890 | A1 * | 2/2006 | Kleckner | A01K 77/00 43/12 |
| 2008/0156715 | A1 * | 7/2008 | Hetzner | A01K 77/00 43/11 |
| 2015/0069100 | A1 * | 3/2015 | Blood | A45F 5/021 224/269 |
| 2015/0113852 | A1 * | 4/2015 | Kudner | A01K 77/00 72/369 |
| 2018/0055023 | A1 | 3/2018 | Evans | |
| 2019/0335731 | A1 * | 11/2019 | Kleckner | A01K 77/00 |
| 2019/0335736 | A1 * | 11/2019 | Makos | B25G 1/04 |

FOREIGN PATENT DOCUMENTS

| | | | |
|---|---|---|---|
| GB | 218225 | | 7/1924 |
| GB | 218225 | A * | 7/1924 |
| GB | 961741 | | 6/1964 |
| GB | 961741 | A * | 6/1964 |

* cited by examiner

NET HAVING HOOP FRAME CONNECTED TO HANDLE

CROSS-REFERENCE TO RELATED APPLICATION

This application claims priority to U.S. application Ser. No. 16/215,111, filed on Dec. 10, 2018, the entirety of which is hereby incorporated by reference.

FIELD

The present disclosure generally relates to nets, and more particularly to a net having a hoop frame connected to a handle.

BACKGROUND

Various types of nets are used in angling and other types of activities. Some nets are known as landing nets and are used to net a fish when the fish is caught by an angler using a fishing pole. After the fish is reeled to within reach of the angler, the fish is netted with the landing net and pulled onto the boat, dock, shore, etc.

SUMMARY

In one aspect, a net comprises a hoop frame configured to support netting to form a head of the net. The hoop frame extends in a substantially hoop shape. The net further comprises a handle including a pole. The pole has a proximal end and a distal end. A yoke connects the hoop frame to the distal end of the pole. At least one of the hoop frame or the distal end of the pole comprise a tubular end portion secured to the yoke. The tubular end portion has an inner surface bounding an interior of the tubular end portion. A plug formed separately from the yoke and tubular end portion is installed in the tubular end portion. The plug includes a plug body and a gasket on the plug body. The gasket forms a seal between the plug body and the inner surface of the tubular end portion. The gasket forms a fluid tight seal with the inner surface.

In another aspect, a net comprises a hoop frame configured to support netting to form a head of the net. The hoop frame extends in a substantially hoop shape. The net further comprises a handle including a pole. The pole has a proximal end and a distal end. A yoke connects the hoop frame to the distal end of the pole. At least one of the hoop frame or the distal end of the pole comprise an end portion secured to the yoke. The end portion has a transverse passage. The yoke includes a yoke shell and a yoke insert protruding inwardly from the yoke shell. The yoke shell at least partially surrounds the tubular end portion. The yoke insert extends laterally into the transverse passage of the tubular end portion.

In yet another aspect, a net comprises a hoop frame configured to support netting to form a head of the net. The hoop frame extends in a substantially hoop shape. The net further comprises a handle including a pole. The pole has a proximal end and a distal end. A yoke connects the hoop frame to the distal end of the pole. The yoke comprises a first yoke portion and a second yoke portion. The first and second yoke portions are separate from and secured to each other. The first and second yoke portions form a first socket in which an end portion of the hoop frame or an end portion of the distal end of the pole is received and sandwiched by the first and second yoke portions.

Other objects and features of the present disclosure will be in part apparent and in part pointed out herein.

BRIEF DESCRIPTION OF THE DRAWINGS

Corresponding reference characters indicate corresponding parts throughout the drawings.

DETAILED DESCRIPTION

Figure 1:
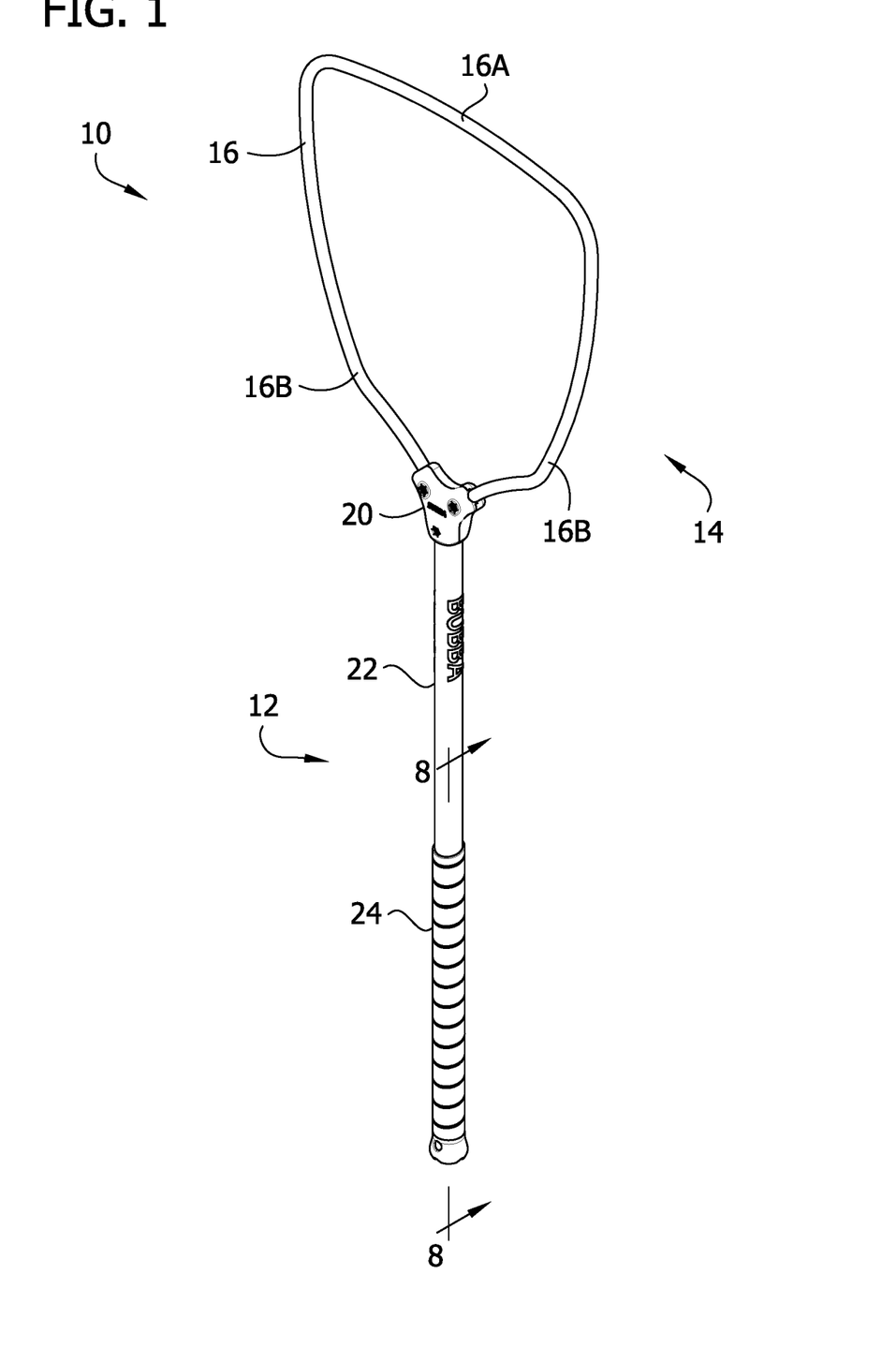
FIG. 1 is a perspective of a net embodying aspects of the present disclosure.

Referring to FIG. 1, a net of the present disclosure is indicated generally by the reference number 10. The net can be used for various purposes, but an example use of the net is as a landing net for landing fish. For example, when an angler has caught a fish using a fishing pole and has reeled the fish to within reach, the landing net 10 can be used to net the fish and bring it into the boat, or onto shore, etc. Although the net 10 is referred to as a landing net, it will be appreciated that the net can be used for various other purposes without departing from the scope of the present invention. Moreover, it will be appreciated that aspects of the net 10 can be incorporated in nets having other configurations for angling or other purposes without departing from the scope of the present invention.

The net 10 includes a handle 12 and a head 14 connected to the handle. A user usually holds the net 10 by the handle 12 and manipulates the handle to position the head 14 to net a fish. The head 14 includes a hoop frame 16 configured for supporting a bag formed of netting (not shown). Various types of netting can be used. For example, the hoop frame 16 can be threaded through openings in the netting bag around a mouth of the netting bag through which a fish is receivable into the bag. The hoop frame 16 is connected to the handle 12 by a yoke 20, described in detail below. Components of the net 10 can be formed of a metal material, such as aluminum, of plastic, of carbon fiber, or of another suitable material.

Figure 8:
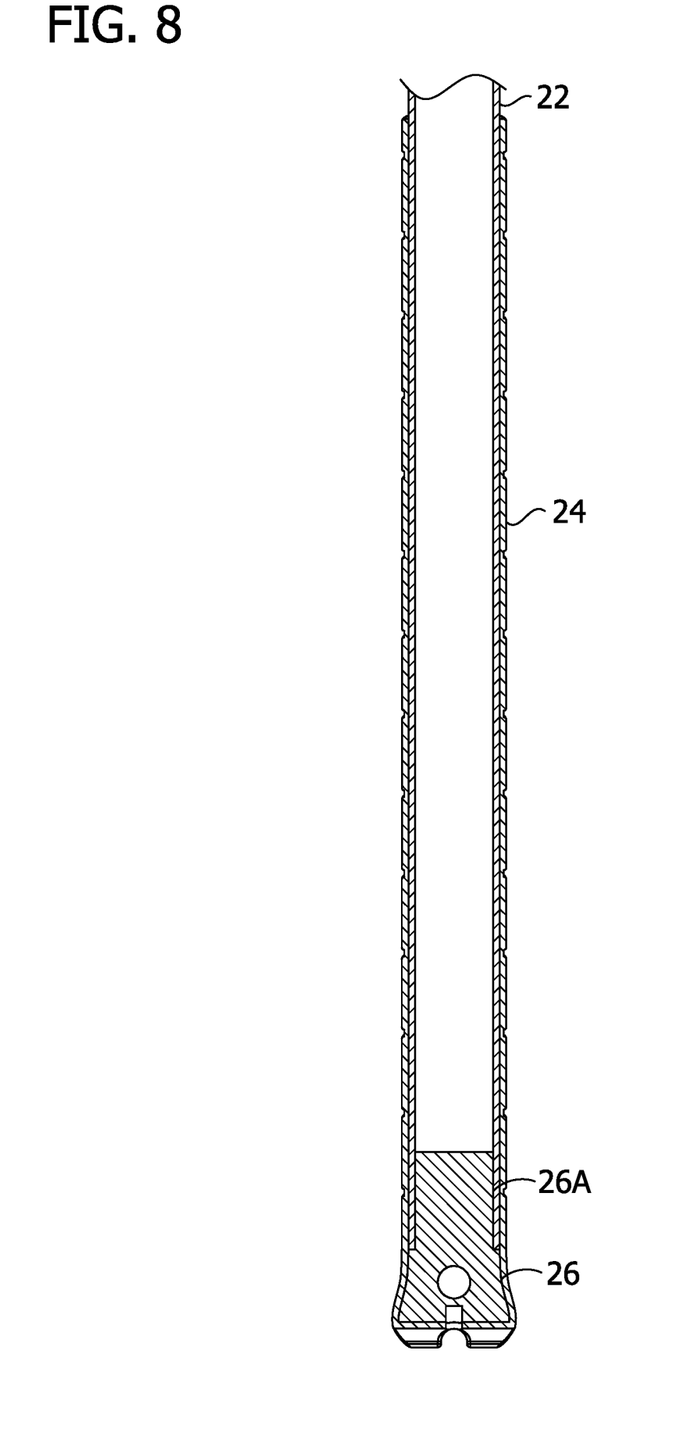
FIG. 8 is a fragmentary section of a lower portion of the pole taken in a plane including line 8-8 of FIG. 1.

In the illustrated embodiment, the handle 12 includes an elongate pole 22 and a grip 24 for assisting the user in gripping the handle. The pole 22 comprises a length of hollow round tubing (e.g., carbon fiber tubing) having a proximal or butt end and a distal end opposite the proximal end. Lateral openings 22' in the end portion of the pole form a transverse passage through the end portion. The distal end is received in the yoke 20 for connecting the pole 22 to the hoop frame 16. As shown in FIG. 8, a butt cap 26 is received in the proximal end of the pole 22, and the grip 24 covers the butt cap and a section of the elongate pole extending distally from the proximal end of the pole. For example, the grip 24 can be a sleeve and be slipped onto the pole over the butt cap 26. Alternatively, the grip 24 can be a wrap wrapped onto the pole 22 and over the butt cap 26. Desirably, the butt cap 26 forms a fluid tight seal with the proximal end of the pole 22 to prevent air or water from passing into or out of the proximal end of the pole. The butt cap 26 includes an insert portion 26A received in the interior of the pole 22 at the proximal end. The interior of the pole 22 is desirably filled with air or foam (not shown) for buoyancy of the net 10, as explained in further detail below. It will be appreciated that the handle 12 can have other configurations (e.g., extendable/retractable) without departing from the scope of the present invention.

In the illustrated embodiment, the hoop frame 16 is formed by a length of aluminum round tubing. The hoop frame 16 is constructed to extend in a substantially hoop shape (i.e., a full, continuous hoop shape or a discontinuous hoop shape having a gap between end portions of the hoop member). In the illustrated embodiment, the hoop frame 16 has an intermediate segment 16A forming a distal most region of the hoop frame and has two arms 16B extending proximally from the intermediate segment. The arms 16B terminate in end portions received in the yoke 20. Lateral openings 16B' in the end portions of the arms form a transverse passage through the end portions. The hoop frame 16 has a hollow interior extending from the end portion of one of the arms 16B, through the intermediate segment 16A, to the end portion of the other arm 16B. The interior can be filled with air or foam for buoyancy. It will be appreciated that other types of hoop frames (e.g., having other constructions or shapes) can be used without departing from the scope of the present invention.

Figure 2:
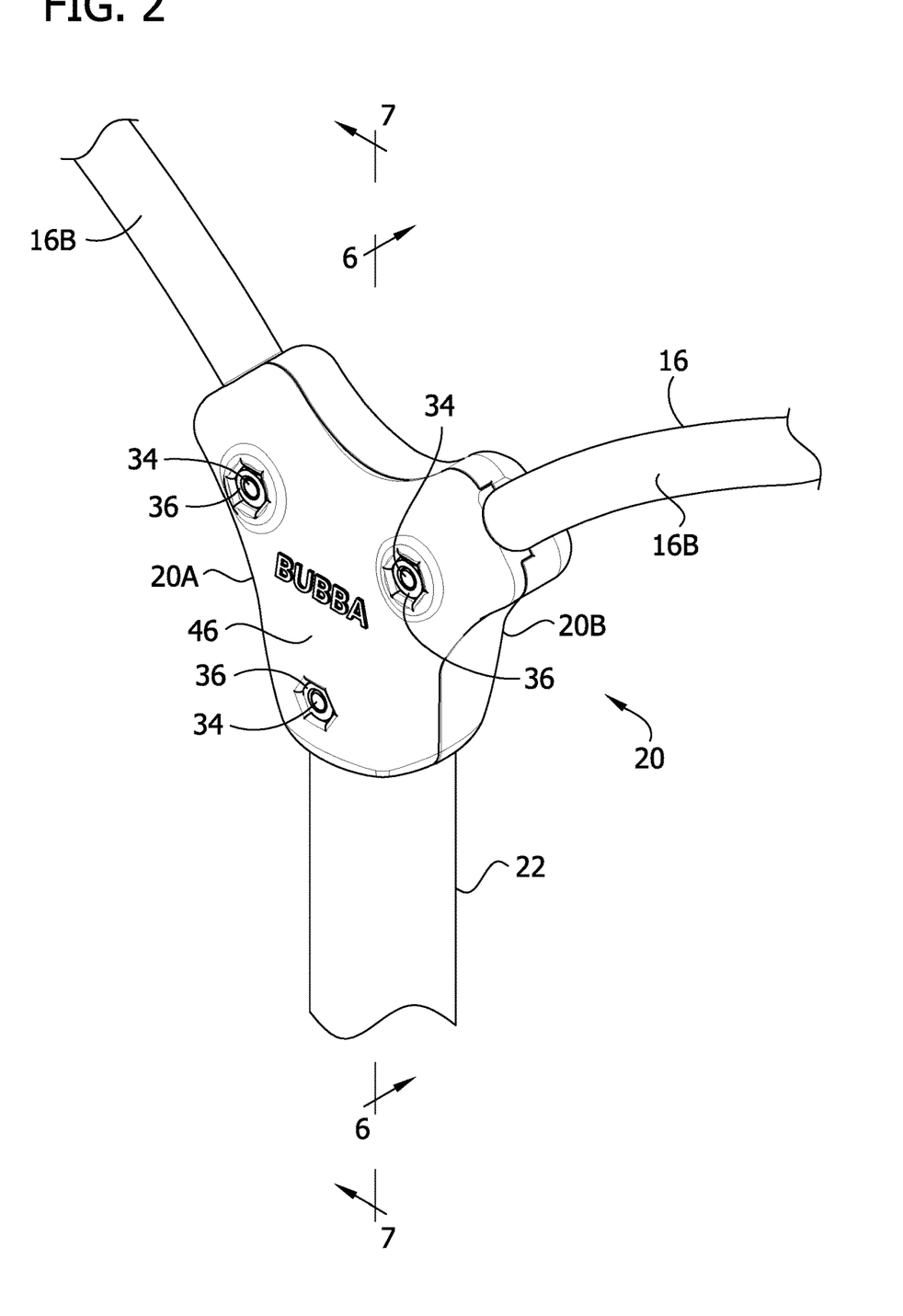
FIG. 2 an enlarged fragmentary view of a yoke of the net connecting a hoop frame to a pole.
Figure 3:
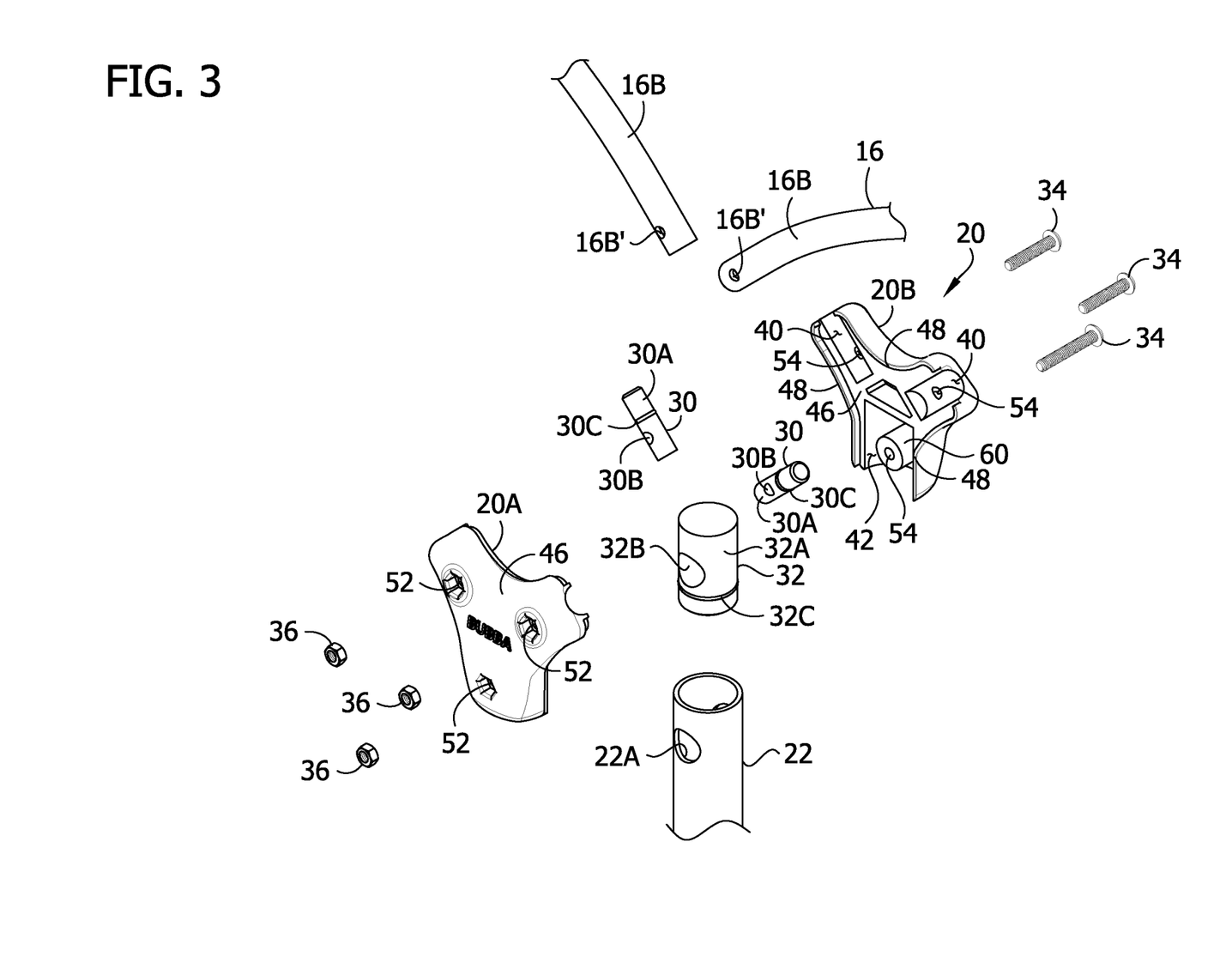
FIG. 3 is a fragmentary exploded view of the yoke, hoop frame, pole, and associated connecting structure.
Figure 4:
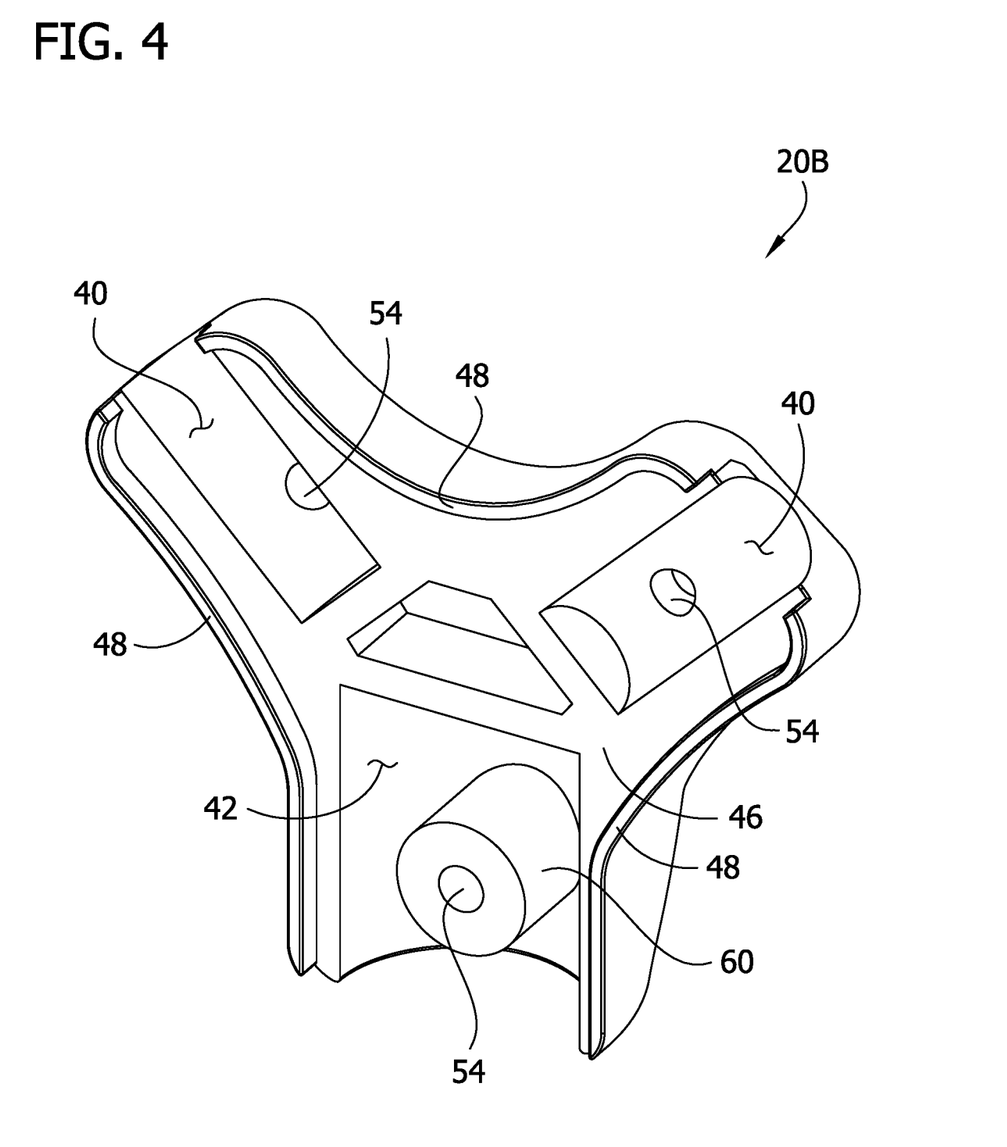
FIG. 4 a front perspective of a rear portion of the yoke.
Figure 5:
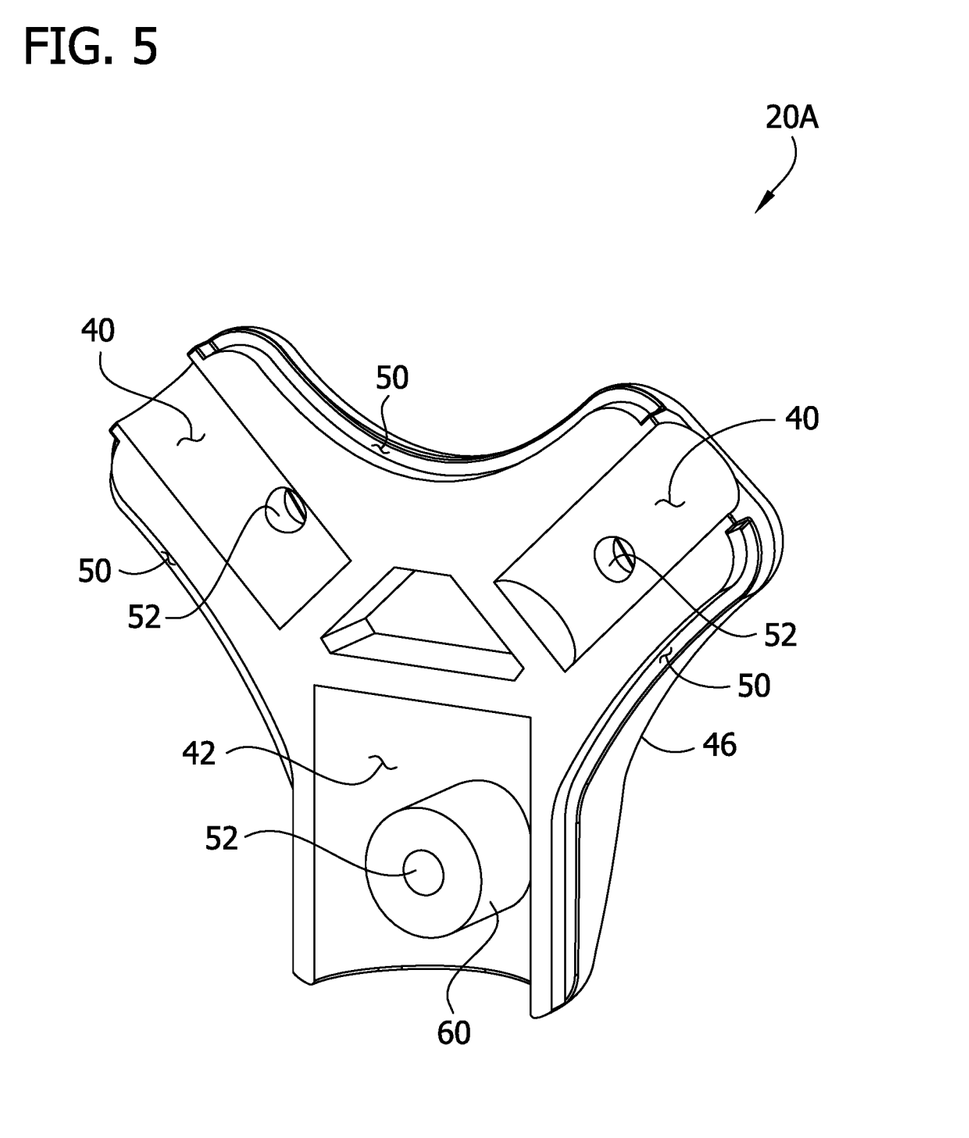
FIG. 5 is a rear perspective of a front portion of the yoke.
Figure 6:
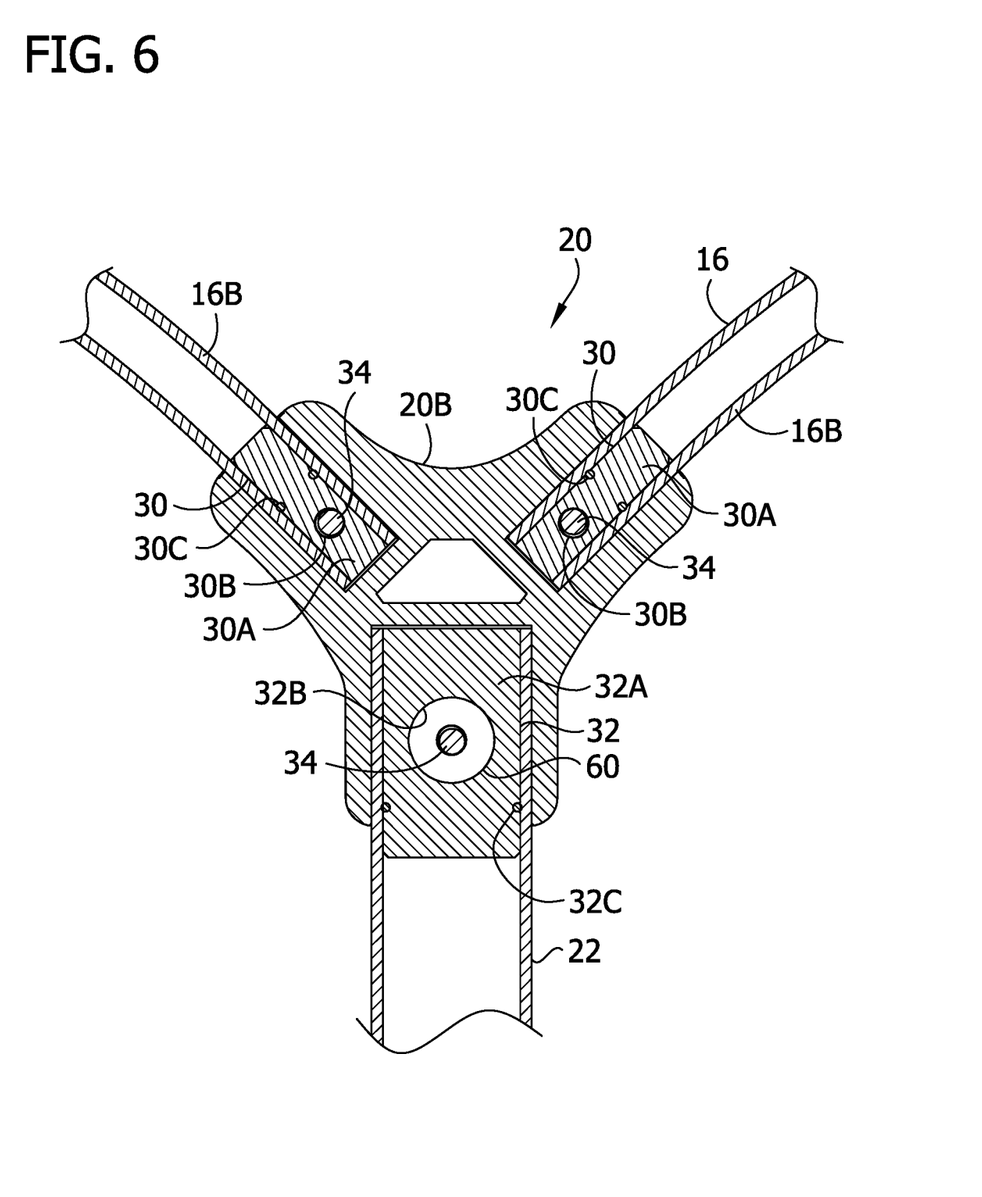
FIG. 6 is a fragmentary section of the net taken in a plane including line 6-6 of FIG. 2.

Referring now to FIGS. 2, 3, and 6, the connection of the hoop frame 16 to the handle 12 is shown in closer detail. In the illustrated embodiment, the yoke 20 receives end portions of the hoop frame arms 16B and an end portion of the distal end of the pole 22 for connecting the hoop frame to the pole. Plugs 30, 32 are received in the end portions of the hoop frame arms 16B and in the end portion of the pole 22. Fasteners 34 (e.g., bolts or screws) and associated lock nuts 36 are provided for securing the end portions of the hoop frame arms 16B and the end portion of the pole 22 in the yoke 20.

The yoke 20 includes first and second upper sockets 40 for receiving the end portions of the hoop frame arms 16B and a lower socket 42 for receiving the end portion of the pole 22. As shown in FIG. 3, the yoke 20 includes a forward (first) yoke member 20A and a rear (second) yoke member 20B. The yoke members 20A, 20B are constructed to be secured to each other and to sandwich the end portions of the arms 16B and pole 22 in the sockets 40, 42. The yoke members 20A, 20B have similar constructions. Each yoke member 20A, 20B includes a yoke shell 46 forming an outer surface of the yoke member and an inner surface of the yoke member that defines three socket portions (arcuate recesses) corresponding to respective ones of the first, second, and third sockets 40, 42. The rear yoke member 20B includes a peripheral lip including a plurality of lip segments 48 protruding forward for reception in corresponding peripheral recesses 50 in the front yoke member 20A. The forward yoke member 20A includes fastener openings 52, and the rear yoke member includes fastener openings 54. When the yoke members 20A, 20B are arranged to form the yoke 20, the corresponding fastener openings 52, 54 are aligned with each other and arranged to receive the fasteners 34 passing through the respective sockets 40, 42 for securing the yoke members to each other and for securing the end portions of the arms 16B and pole 22 in the sockets. In the illustrated embodiment, heads of the fasteners 34 are received in countersink recesses in the rear yoke member 20B and the lock nuts into which the fasteners are threaded are received in countersink recesses in the forward yoke member 20A.

The plugs 30, 32 are constructed to enhance the strength of the end portions of the arms 16B and the end portion of the pole 22, and to prevent egress of air and ingress of water past the plugs. The hoop frame plugs 30 each include a generally cylindrical plug body 30A having a transverse bore 30B. The plug bodies 30A can be formed of plastic or another suitable material. The plugs bodies 30A are sized to fit inside the interior of the end portions of the hoop frame arms 16A. The transverse bore 30B is sized to receive shanks of the fasteners 34 when the fasteners pass through the end portions of the arms 16B. The plugs 30 also include O-rings 30C (broadly, "gaskets") received in annular recesses in the plug bodies 30A. The annular recesses positively locate the O-rings 30C on the plug bodies and maintain the O-rings in position on the plug bodies. When the hoop frame plugs 30 are received in the end portions of the arms 16B, the O-rings 30C form fluid tight seals against inner surfaces of the end portions. Desirably, the O-rings 30C are made of a resiliently compressible material and are sized and shaped such that the O-rings are compressed between the plug body 30A and the inner surface of the end portion of the arm 16b to form a suitable annular or circumferential seal. As a result, air is trapped inside the hoop frame 16, and water is prevented from entering the hoop frame, such that the hoop frame is buoyant, and the user does not experience the undesirable sensation of water sloshing inside the hoop frame as a result of water ingress into the hoop frame.

Like the hoop frame plugs 30, the pole plug 32 includes a generally cylindrical plug body 32A having a transverse bore 32B. The plug body 30A is sized to fit inside the interior of the end portion of the pole 22. The transverse bore 30B is sized to receive a shank of the fastener 34 when the fastener is passed through the end portion of the pole 22. The plug 32 also includes an O-ring 32C (broadly, "gasket") received in an annular recess in the plug body 32A. When the pole plug 32 is received in the end portion of the pole 22, the resiliently compressible material of the O-ring 32C is compressed between the plug body and the inner surface of the end portion to form a suitable annular or circumferential fluid tight seal. The result is air is trapped inside the pole 22 (in coordination with the butt cap), and water is prevented from entering the pole, such that the pole is buoyant, and the user does not experience the undesirable sensation of water sloshing inside the pole as a result of water ingress into the pole.

Figure 7:
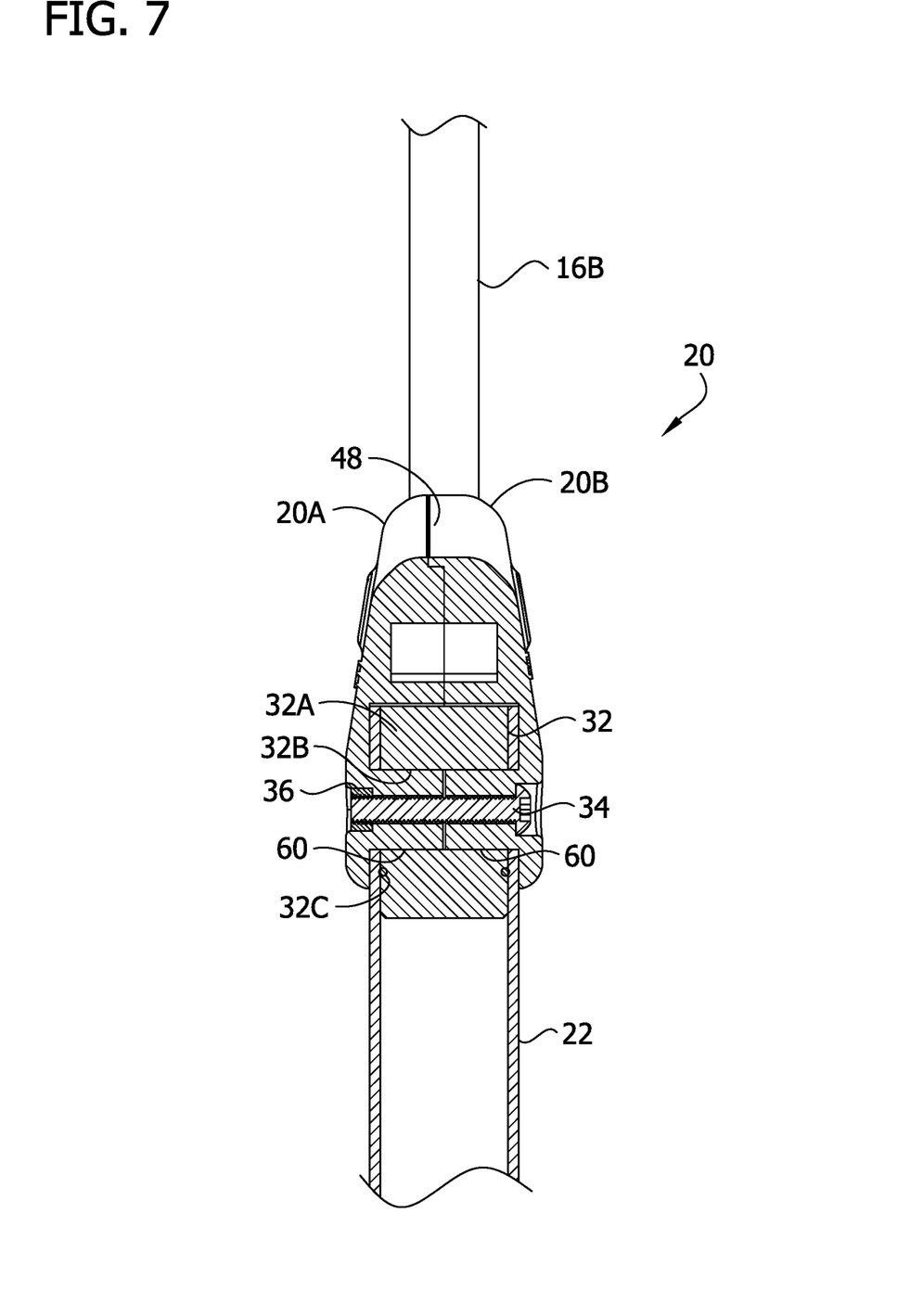
FIG. 7 is a fragmentary section of the net taken in a plane including line 7-7 of FIG. 2.

To further strengthen the connection of the pole 22 to the yoke 20, the yoke includes yoke inserts 60 on each yoke member 20A, 20B protruding inwardly from the yoke shells 46. The yoke inserts 60 are provided in the form of cylindrical protrusions sized to fit in the transverse bore 32B of the pole plug 32 and in the transverse passage of the end portion of the pole 22. As shown in FIG. 7, when the yoke members 20A, 20B are assembled on the end portion of the pole, the yoke inserts 60 extend in respective forward and rearward directions into the end portion and into the plug 32. The yoke inserts 60 are tubular and have passages for receiving the fastener 34. In the illustrated embodiment, the yoke inserts 60 are formed integrally with the yoke shells 46 (i.e., formed as the same piece of material as the yoke shells). For example, the yoke members 20A, 20B can be formed of cast aluminum such that the yoke inserts 60 are formed integrally with the yoke shells. The transverse passage of the end portion of the pole 22, and the transverse bore 32B of the pole plug 32, have diameters corresponding closely to the diameters of the yoke inserts 60, whereas the transverse passage of the end portions of the arms 16B, and the transverse bores 30B of the hoop frame plugs 30, have diameters corresponding closely to the diameter of the associated fasteners 34. The reception of the yoke inserts 60 in the end portion of the pole 22 and the pole plug 32 provides added strength to the connection and assists in preventing the pole from being pulled out of the yoke 20.

In a method of manufacturing the net 10, after the hoop frame 16 is formed, the hoop frame plugs 30 can be installed in the end portions of the hoop frame arms 16B. After the pole plug 32 is installed in the end portion of the pole 22, the yoke 20 can be assembled over the end portions of the hoop frame arms 16B and the pole. The fasteners 34 are then installed to secure the end portions in the yoke 20 sandwiched by the yoke members 20A, 20B. Before assembling the hoop frame 16 with the yoke 20, a selected netting bag (not shown) can be installed on the hoop frame. Before or after assembling the pole 22 with the yoke 20, the butt cap 26 and grip 24 can be applied to the proximal end of the pole.

It will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A net comprising:
    a hoop frame configured to support netting to form a head of the net, the hoop frame extending in a substantially hoop shape;
    a handle comprising a pole, the pole having a proximal end and a distal end;
    a yoke connecting the hoop frame to the distal end of the pole;
    at least one of the hoop frame or the distal end of the pole comprising an end portion secured to the yoke, the end portion having a transverse passage; and
    the yoke including a yoke shell and a yoke insert protruding inwardly from the yoke shell, the yoke shell at least partially surrounding the tubular end portion, the yoke insert extending laterally into the transverse passage of the tubular end portion.

2. A net as set forth in claim 1, wherein the yoke insert is formed as the same piece of material as the yoke shell.

3. A net as set forth in claim 2, wherein the yoke insert is tubular.

4. A net as set forth in claim 1, further comprising a fastener securing the tubular end portion to the yoke shell, the fastener extending in the transverse passage of the tubular end portion and in the yoke insert.

5. A net as set forth in claim 1, further comprising a plug in the tubular end portion, the plug having a transverse bore, the yoke insert extending in the transverse bore of the plug.

6. A net as set forth in claim 5, further comprising a fastener securing the end portion to the yoke shell, the fastener extending in the transverse passage of the end portion, in the yoke insert, and in the plug.

7. A net comprising:
    a hoop frame configured to support netting to form a head of the net, the hoop frame extending in a substantially hoop shape;
    a handle comprising a pole, the pole having a proximal end and a distal end;
    a yoke connecting the hoop frame to the distal end of the pole, the yoke comprising a first yoke portion and a second yoke portion, the first and second yoke portions being separate from and secured to each other, the first and second yoke portions forming a first socket in which an end portion of the hoop frame or an end portion of the distal end of the pole is received and sandwiched by the first and second yoke portions.

8. A net as set forth in claim 7, further comprising a first fastener, the first fastener passing through the first socket and the end portion.

9. A net as set forth in claim 7, wherein the end portion has a plug therein, the plug formed separately from the yoke and the end portion, the plug including a gasket forming a fluid tight seal with an inner surface of the end portion.

* * * * *